United States Patent
Bodart et al.

(10) Patent No.: US 7,019,068 B2
(45) Date of Patent: Mar. 28, 2006

(54) POLYMER COMPOSITIONS COMPRISING TELOMERS AND ARTICLES OR PARTS USING THESE COMPOSITIONS

(75) Inventors: Vincent Bodart, Tavaux (FR); Fredy Declerck, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/466,105

(22) PCT Filed: Jan. 16, 2002

(86) PCT No.: PCT/EP02/00505

§ 371 (c)(1),
(2), (4) Date: Dec. 12, 2003

(87) PCT Pub. No.: WO02/057351

PCT Pub. Date: Jul. 25, 2002

(65) Prior Publication Data

US 2004/0097625 A1 May 20, 2004

(30) Foreign Application Priority Data

Jan. 19, 2001 (FR) .................................. 01 00778

(51) Int. Cl.
*C08L 27/06* (2006.01)
*C08K 5/092* (2006.01)
*C08K 5/101* (2006.01)

(52) U.S. Cl. ........................ 524/569; 524/311; 524/321

(58) Field of Classification Search ................ 524/569, 524/469, 311, 321
See application file for complete search history.

(56) References Cited

U.S. PATENT DOCUMENTS

| 2,820,772 A | * | 1/1958 | Barnhart ..................... 524/462 |
| 3,022,261 A | * | 2/1962 | Fields et al. ................. 524/123 |
| 3,173,888 A |   | 3/1965 | Von Bramer et al. |
| 3,655,589 A | * | 4/1972 | Wingler et al. ............. 521/137 |

FOREIGN PATENT DOCUMENTS

| EP | 0 438 215 | 7/1991 |
| FR | 1 441 248 | 8/1966 |
| FR | 1 469 454 | 2/1967 |

* cited by examiner

*Primary Examiner*—Peter Szekely
(74) *Attorney, Agent, or Firm*—Oblon, Spivak, McClelland, Maier & Neustadt, P.C.

(57) ABSTRACT

Composition comprising one or more polymers and one or more substances selected from telomers having a number average degree of telomerization of less than or equal to 8.0 (substances A) and optionally from substances such as diesters of phthalic acid or diesters of saturated aliphatic α,ω-dicarboxylic acids (substances B), the weight of substance(s) A plus substance(s) B together relative to the weight of the composition being greater than 20%, on the one hand, and the weight of substance(s) A relative to the weight of substance(s) A plus substance(s) B together being greater than 20%, on the other hand. Articles or parts of articles manufactured using this composition.

20 Claims, No Drawings

POLYMER COMPOSITIONS COMPRISING TELOMERS AND ARTICLES OR PARTS USING THESE COMPOSITIONS

The present invention pertains to compositions and to articles or parts of articles manufactured using these compositions.

The preparation is known of polymer compositions, especially compositions of polymers of vinyl chloride, which include a high level of low molecular weight diesters such as the diesters of phthalic acid and the diesters of saturated aliphatic α,ω-dicarboxylic acids or else of other low molecular weight substances such as CERECLOR® chlorinated paraffins; these are commonly used to manufacture articles or parts of articles exhibiting increased flexibility. These polymer compositions, however, have a number of disadvantages. Those which include a high level of diesters of phthalic acid are sharply criticized owing to the hypothetical toxicity of these diesters. Those which include a high level of other low molecular weight substances such as CERECLOR® chlorinated paraffins are subject to problems of incompatibility between their various ingredients or exhibit homogeneity defects. Lastly, more specifically, the plastisol compositions, which most often include polymers of vinyl chloride obtained by emulsion or microsuspension processes and diesters of phthalic acid, often exhibit a less-than-optimum combination of properties; one customary defect of these compositions is that they are difficult to deaerate.

The manufacture is known, as well, of articles or parts of articles, customarily flexible, from polymer compositions (especially compositions of polymers of vinyl chloride) which include a high level of diesters or other low molecular weight substances such as those mentioned above. These articles or parts of articles nevertheless exhibit a large number of deficient properties: these articles or parts of articles very often have a high level of emissions, poor resistance to migration (with problems of exudation), and poor resistance to extraction and to staining (when they are placed in contact with a liquid such as water, milk, blood, n-hexane or oil).

A first object of the present invention is a composition which does not have the disadvantages of the prior compositions, while retaining their advantages.

The invention accordingly provides a composition comprising one or more polymers and one or more substances selected from substances A and, if desired, from substances B, the weight of substance(s) A plus substance(s) B together relative to the weight of the composition being greater than 20%, on the one hand, and the weight of substance(s) A relative to the weight of substance(s) A plus substance(s) B together being greater than 20%, on the other hand, the substances A being telomers having a number average degree of telomerization of less than or equal to 8.0 and obtained by (co)telomerization reaction of one or more telogens and one or more monomers corresponding to the formula I:

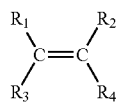
(I)

in which $R_1$, $R_2$, $R_3$ and $R_4$, which are identical or different, represent groups

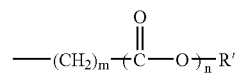

the indices m independently of one another are integers from 0 to 20,
the indices n independently of one another are 0 or 1,
the sum of the indices n is from 1 to 3,
when n=0, the radicals R' independently of one another are a hydrogen atom, a halogen atom or a phenyl group,
when n=1, the radicals R' independently of one another are alternatively hydrogen atoms or alkali metal atoms, ammonium groups, halogen atoms, or else hydrocarbon groups, the latter being optionally substituted by one or more halogen atoms or —OH, —COOH, —NH₂, —CONH₂ or —N═C═O groups, the substances B being diesters of phthalic, terephthalic and isophthalic acids, triesters of trimellitic acid, diesters of saturated aliphatic α,ω-dicarboxylic acids, acetylated or non-acetylated triesters of citric acid, triesters of phosphoric acid, and alkylene glycol dibenzoates and alkylsulphonic esters of phenol.

The polymer(s) are all the polymers which may be usefully present in compositions which include one or more substances selected from substances A and, if desired, from substances B.

By way of examples of such polymers, mention may be made of halogenated vinyl polymers, vinyl polyesters, including vinyl acetate polymers, (meth)acrylic polymers, polyesters, polysiloxanes, polyamides, polysulphides, polyurethanes, polyethers, epoxy resins, alkyd resins, rosin, nitrocellulose, cellulose acetates, polyvinyl alcohols, chlorinated polyethylenes, natural rubber, synthetic rubbers such as copolymers of styrene and butadiene, neoprene, isoprene, chloroprene, and graft polymers prepared on the basis of a butadiene polymer.

Preferably, at least 80% by weight of the polymers of the composition according to the invention are halogenated vinyl polymers.

With particular preference, at least 90% by weight of the polymers of the composition according to the invention are halogenated vinyl polymers.

With very particular preference, all of the polymers of the composition according to the invention are halogenated vinyl polymers.

The term halogenated vinyl polymers is intended to denote both the homopolymers of ethylenically unsaturated monomers containing at least one halogen atom and containing no heteroatom other than the halogen atom(s), and the copolymers formed by these monomers with themselves or with other ethylenically unsaturated monomers such as olefins, acrylic and methacrylic amides, nitriles and esters, and vinyl esters such as vinyl acetate.

By way of examples of halogenated vinyl polymers, mention may be made of halogenated vinyl polymers containing chlorine and halogenated vinyl polymers containing fluorine, such as vinylidene fluoride polymers, hexafluoropropylene polymers or chlorotrifluoroethylene polymers.

The halogenated vinyl polymers of the composition according to the invention are preferably halogenated vinyl polymers containing chlorine.

By way of examples of halogenated vinyl polymers containing chlorine, mention may be made of polymers of vinyl chloride or of vinylidene chloride or of chlorotrifluoroethylene.

With particular preference, the halogenated vinyl polymers of the composition according to the invention are vinyl chloride polymers containing at least 80% by weight of —(—CH$_2$—CHCl—)— units.

With very particular preference, the halogenated vinyl polymers of the composition according to the invention are vinyl chloride homopolymers.

When the compositions according to the invention form compounds or plastified mixtures of the "dry blend" type, the most preferred halogenated vinyl polymers of the composition according to the invention are vinyl chloride homopolymers obtained by bulk or suspension polymerization processes.

When the compositions according to the invention form plastisols, the most preferred halogenated vinyl polymers of the composition according to the invention are vinyl chloride homopolymers obtained by microsuspension or emulsion polymerization processes.

The polymers of the composition according to the invention other than the halogenated vinyl polymers are preferably (meth)acrylic polymers, polyesters and graft polymers prepared on the basis of a butadiene polymer.

By way of examples of (meth)acrylic polymers, mention may be made of polymethyl methacrylate, poly-n-butyl acrylate, and the copolymers of methyl methacrylate and n-butyl acrylate.

By way of examples of polyesters, mention may be made of polyesters obtained by condensation reaction of phthalic acid or a saturated aliphatic α,ω-dicarboxylic acid and a diol.

By way of examples of graft polymers prepared on the basis of a butadiene polymer, mention may be made of graft polymers obtained by polymerizing methyl methacrylate in the presence of polybutadiene or in the presence of a copolymer of butadiene and styrene, and graft polymers obtained by polymerizing styrene and acrylonitrile in the presence of polybutadiene.

The substances A are telomers having a number average degree of telomerization of less than or equal to 8.0 and obtained by (co)telomerization reaction of one or more monomers corresponding tot the formula I and one or more telogens.

The term "number average degree of telomerization" of the telomers obtained by (co)telomerization reaction of one or more monomers (hereinafter denoted M$_1$, . . . , M$_n$) and one or more telogens is intended to denote the ratio between the number of molecules of monomer(s) making up the telomers and the number of telomer molecules:

$$DP_n = n(M_1) + n(M_2) + \ldots + n(M_n)$$

where n(M$_n$) represents the ratio between the number of molecules of the monomer M$_n$ making up the telomers and the number of telomer molecules.

Preferably, the substances A have a number average degree of telomerization of less than or equal to 5.0 and, with particular preference, the substances A have a number average degree of telomerization of less than or equal to 3.0.

With further preference, the substances A have a number average degree of telomerization of greater than or equal to 1.2 and, with particular preference, the substances A have a number average degree of telomerization of greater than or equal to 1.3.

The substances A customarily exert a plasticizing effect on the polymers of the composition.

The weight of substance(s) A relative to the weight of the composition according to the invention is preferably greater than 20%; with particular preference, it is greater than 30%; with very particular preference, it is greater than 35%.

The (co)telomerization reactions which lead to the substances A being obtained are conducted with the involvement of one or more monomers corresponding to the formula I.

Preferably, the monomers corresponding to the formula I meet at least one of the following conditions:
the sum of the indices m is from 0 to 2,
the sum of the indices n is 1,
when n=0, R' represents a hydrogen atom,
when n=1, the radicals R' independently of one another are a linear or branched alkyl or alkenyl chain containing 1 to 20 carbon atoms which is optionally substituted by one or more halogen atoms or —OH, —COOH, —NH$_2$, —CONH$_2$ or —N=C=O groups.

By way of examples of such monomers, mention may be made of:
monomers corresponding to the formula I meeting all of the four conditions as set out above
monomers for which the sum of the indices m is greater than 2, such as alkyl trans-2-methyl-2-pentenoates, alkyl trans-2-hexenoates, alkyl trans-3-hexenoates, alkyl 5-hexenoates, alkyl 2,2-dimethyl-4-pentenoates and alkyl 6-heptenoates;
monomers for which the sum of the indices n is greater than 1, such as dialkyl maleates, dialkyl fumarates, dialkyl itaconates, dialkyl citraconates, and trialkyl cis- and trans-aconitates;
monomers in which at least one R' for which n=0 represents a halogen atom or a phenyl group, such as alkyl chloroacrylates, alkyl bromoacrylates, alkyl fluoroacrylates and alkyl cinnamates;
monomers in which at least one R' for which n=1 represents a hydrogen atom or an alkali metal atom, such as acrylic acid, sodium acrylate, potassium acrylate, methacrylic acid, sodium methacrylate, potassium methacrylate and maleic acid.

With particular preference, the monomers corresponding to the formula I meet all of the four conditions set out above.

By way of examples of such monomers, mention may be made of C$_1$–C$_{20}$ alkyl acrylates, C$_1$–C$_{20}$ alkyl methacrylates, C$_1$–C$_{20}$ allyl vinylacetates, C$_1$–C$_{20}$ alkyl crotonates, C$_1$–C$_{20}$ alkyl ethacrylates, C$_1$–C$_{20}$ alkyl tiglates, C$_1$–C$_{20}$ alkyl 3,3-dimethylacrylates, C$_1$–C$_{20}$ alkyl trans-2-pentenoates and C$_1$–C$_{20}$ alkyl 4-pentenoates.

With very particular preference, the monomers corresponding to the formula I are selected from C$_1$–C$_{20}$ alkyl acrylates and from C$_1$–C$_{20}$ alkyl methacrylates.

By way of examples of C$_1$–C$_{20}$ alkyl acrylates or methacrylates, mention may be made of methyl, ethyl, n-propyl, isopropyl, n-butyl, isobutyl, tert-butyl, n-pentyl, isopentyl, neopentyl, n-hexyl, isohexyl, n-octyl, 2-ethylhexyl, isodecyl and isotridecyl acrylates or methacrylates.

The most preferred monomers corresponding to the formula I are either C$_1$–C$_8$ alkyl acrylates or C$_1$–C$_8$ alkyl methacrylates, provided that the latter are employed in the presence of one or more C$_1$–C$_8$ alkyl acrylates.

Some or all of each of the monomers may be introduced into the reaction medium before the reaction starts or during its course.

When the monomers are alkyl acrylates, all of them are customarily introduced into the reaction medium before the reaction starts.

The (co)telomerization reactions which lead to substances A being obtained are carried out with the involvement of one or more telogens.

By way of examples of telogens, mention may be made of:

mercaptans of formula R"SH in which R" is a hydrocarbon group optionally substituted by one or more halogen atoms or —OH, —COOH, —NH$_2$, —CONH$_2$ or —N=CO=O groups chlorinated substances such as carbon tetrachloride, chloroform or ethyl trichloroacetate low molecular weight alcohols such as isopropanol.

Preferably, the telogens are mercaptans of formula R"SH in which R" is a hydrocarbon group optionally substituted by one or more halogen atoms or —OH, —COOH, —NH$_2$, —CONH$_2$ or —N=C=O groups.

By way of examples of such mercaptans, mention may be made of 2-mercaptoethanol, 1-butanethiol, n-dodecyl mercaptan and mercaptoacetic acid.

Of particular preference, the telogens are 2-mercaptoethanol and 1-butanethiol.

The amount of telogen(s) is customarily between 0.02 and 20 mol per mole of monomer(s). It is most often between 0.1 and 1 mol per mole of monomer(s).

Some or all of each of the telogens may be introduced into the reaction medium before the reaction starts or during its course. Customarily, all of the telogens are introduced into the reaction medium before the reaction starts.

The telomerization reaction is customarily initiated conventionally by one or more initiators. These are organic or inorganic peroxides or diazo compounds (in the case of simple radical telomerization reaction) or else, when the telogen is a chlorinated substance, reductive metallic cations able to form a complex with the chlorine (in the case of radical telomerization reaction by redox catalysis).

By way of examples of organic peroxides, mention may be made of acetylcyclohexanesulphonyl peroxide, tert-amyl perpivalate, dilauroyl peroxide, dibenzoyl peroxide, diisopropyl peroxydicarbonate, tert-butyl perneodecanoate, tert-butyl perbenzoate, cumene hydroperoxide and tert-butyl hydroperoxide.

By way of examples of inorganic peroxides, mention may be made of hydrogen peroxide and ammonium persulphate.

By way of examples of diazo compounds, mention may be made of azobisisobutyronitrile and azobis-2,4-dimethylvaleronitrile.

By way of examples of reductive metallic cations able to form a complex with the chlorine, mention may be made of cuprous copper and ferrous iron, in chloride or sulphate form.

The amount of initiator(s) is customarily between 1 and 100 mmol per mole of monomer(s). It is most often between 2 and 50 mmol per mole of monomer(s).

Some or all of each of the initiators may be introduced into the reaction medium before the reaction starts or during its course. Customarily, all of the initiators are introduced into the reaction medium before the reaction starts.

The reaction medium may further comprise reducing agents such as ascorbic acid or sodium formaldehyde sulphoxylate and solubilizing agents for the salts of reductive metallic cations, such as acetonitrile.

The temperature of the telomerization reaction depends primarily on the nature of the initiators; it also depends, inter alia, on the nature of the monomers and of the telogens. The reaction temperature is customarily between 0° C. and 200° C. In the case of simple radical telomerization reaction, it is most often between 30° C. and 130° C., and in the case of radical telomerization reaction by redox catalysis it is most often between 80° C. and 180° C. By way of examples, 60° C. is a particularly suitable working temperature for the telomerization reaction of n-butyl acrylate in the presence of azobisisobutyronitrile (as initiator) and 2-mercaptoethanol (as telogen); 135° C. is a particularly appropriate working temperature for the telomerization reaction of n-butyl acrylate in the presence of cuprous chloride (as initiator) and carbon tetrachloride (as telogen).

The telomerization reaction customarily proceeds conventionally in accordance with a radical mechanism including an initiation step, a propagation step, a transfer step and a termination step. In the case of telomerization reaction by redox catalysis, the metallic ion, which is oxidized and complexed during the initiation step, is regenerated during the termination step.

The substances B are diesters of phthalic, terephthalic and isophthalic acids, triesters of trimellitic acid, diesters of saturated aliphatic α,ω-dicarboxylic acids, acetylated or non-acetylated triesters of citric acid, triesters of phosphoric acid, and alkylene glycol dibenzoates and alkylsulphonic esters of phenol.

By way of examples of esters of phthalic, terephthalic and isophthalic acids, mention may be made of di-n-butyl phthalate, di-n-hexyl phthalate, diisoheptyl phthalate, di-n-octyl phthalate, di-2-ethylhexyl phthalate, di-2-ethylhexyl terephthalate, di-2-ethylhexyl isophthalate, diisononyl phthalate, diisodecyl phthalate, diisotridecyl phthalate, and benzyl n-butyl phthalate.

By way of example of triesters of trimellitic acid, mention may be made of tri-2-ethylhexyl trimellitate.

Preferably, the substances B are selected from diesters of saturated aliphatic α,ω-dicarboxylic acids, acetylated or non-acetylated triesters of citric acid, triesters of phosphoric acid, and from alkylene glycol dibenzoates and alkylsulphonic esters of phenol.

By way of examples of acetylated or non-acetylated triesters of citric acid, mention may be made of tri-n-butyl citrate and acetylated tri-n-butyl citrate.

By way of examples of triesters of phosphoric acid, mention may be made of tri-2-ethylhexyl phosphate and tricresyl phosphate.

By way of examples of alkylene glycol dibenzoates, mention may be made of dipropylene glycol dibenzoate.

By way of examples of alkylsulphonic esters of phenol, mention may be made of MESAMOLL® alkylsulphonic esters of phenol.

With particular preference, the substances B are selected from diesters of saturated aliphatic α,ω-dicarboxylic acids.

By way of examples of diesters of saturated aliphatic α,ω-dicarboxylic acids, mention may be made of di-n-butyl sebacate, di-2-ethylhexyl sebacate, dibenzyl sebacate, di-2-ethylhexyl adipate, benzyl 2-ethylhexyl adipate and di-2-ethylhexyl azelate.

The substances B customarily have a plasticizing effect on the polymers of the composition.

The weight of substance(s) B relative to the weight of the composition according to the invention is preferably less than 20%; with particular preference, it is less than 10%; with very particular preference, it is less than 5%. The most preferred compositions are those which contain no substances B except possibly for traces.

The compositions according to the invention, in particular the compositions according to the invention comprising at least one vinyl chloride polymer, may further comprise the following: fillers such as natural or precipitated calcium carbonate, dolomite, silica; heat stabilizers such as organic salts of tin, of barium and zinc, of calcium and zinc, of cadmium and zinc, and of lead; pigments such as titanium dioxide or carbon black; internal lubricants such as stearic acid; external lubricants such as paraffins; diluents such as dodecylbenzene or kerosene; viscosity regulators such as condensates of ethylene oxide with fatty acid; blowing agents such as azodicarbonamide; blowing agent breakdown accelerators such as zinc oxide; flame retardants; fungicides, bactericides; and odour modifiers.

The compositions according to the invention may be prepared conventionally by any known technique of mixing or compounding.

A further object of the present invention is the use of compositions which do not have the disadvantages of the prior art compositions for the manufacture of articles or parts of articles (compact or cellular) which likewise no longer have the disadvantages of prior art articles or parts of articles.

The invention accordingly provides the use of compositions according to the invention, as defined above, for manufacturing articles or parts of articles.

The compositions according to the invention are customarily used conventionally, employing known implementation techniques.

By way of examples of implementation techniques, mention may be made of calendering (to manufacture, in particular; films, sheets and plates), extrusion (to manufacture, in particular, tubes and profiles), injection (to manufacture, in particular, gaskets and pieces), coating (to manufacture, in particular, compact layers and cellular layers), spray-gun spraying (to manufacture, in particular, mastics), dipping (to manufacture, in particular, gloves) and moulding (to manufacture various objects).

The techniques of calendering, extrusion and injection are particularly well suited for the implementation of compositions according to the invention in which at least 80% by weight of the polymers are polymers of vinyl chloride containing at least 80% by weight of —(CH$_2$—CHCl—)— units, these polymers having been obtained preferably by a process of bulk or suspension polymerization. Such compositions customarily form compounds or plastified mixtures of the "dry blend" type.

The techniques of coating, spray-gun spraying, dipping and moulding are particularly well suited for the implementation of compositions according to the invention in which at least 80% by weight of the polymers are polymers of vinyl chloride containing at least 80% by weight of —(—CH$_2$CHCl)— units, these polymers having being obtained preferably by a microsuspension or emulsion polymerization process. Such compositions customarily form plastisols.

A final object of the present invention comprises articles or parts of articles (compact or cellular) manufactured from compositions, the said articles or parts of articles not having the disadvantages of the prior art, but retaining their advantages.

The invention accordingly provides articles or parts of articles manufactured using the compositions according to the invention as defined above.

By way of examples of such articles or parts of articles, mention may be made of:
   flexible compact layers, films, sheets and plates
   flexible tubes and piping, cable sheaths
   sealing materials, gaskets, crown corks, anti-corrosion mastics and anti-stone-chipping mastics
   cellular layers and foams
   inks
   adhesives
   flexible pieces, objects or parts of objects: gloves, dolls, balls, etc.

The compositions according to the invention, especially the compositions according to the invention including at least one vinyl chloride polymer, have a multiplicity of advantages. Although the compositions according to the invention include a very high level of substances A, these substances physically have a very high stability: they are not subject to problems of incompatibility between their various ingredients, nor to homogeneity defects which might result therefrom. Furthermore, the compositions according to the invention include substances A which are reputed to have a favourable toxicological status. Finally, the compositions according to the invention including at least one vinyl chloride polymer obtained by the emulsion process or by the microsuspension process form plastisol compositions having a low viscosity; moreover, these compositions are very easy to deaerate.

The articles or parts of articles according to the invention, in particular those manufactured from compositions including at least one vinyl chloride polymer, also have a multiplicity of advantages. They have a high level of flexibility; the greater the extent to which the compositions according to the invention include a high level of substances A, the more flexible these articles are. Moreover, the articles or parts of articles according to the invention, even those manufactured from compositions including a very high level of substances A, have a low level of emissions and a very high migration resistance (they are not subject to problems of exudation). Furthermore, when the articles or parts of articles according to the invention (including those having a very high level of substances A) are placed in contact with a liquid such as water, milk, blood, n-hexane or oil, only a very small amount of material is extracted from them by the liquid and, conversely, these articles or parts of articles allow very little of the liquid to penetrate them, thereby giving them both an excellent resistance to extraction and an excellent resistance to staining.

The examples which follow are intended to illustrate the invention without, however, limiting its scope.

EXAMPLE 1

Preparation and Characterization of Substances A

Preparation of Substances A.

n-Butyl acrylate and then the telogen were introduced at ambient temperature in the amounts indicated in Table 1 below into an open 300 ml reactor equipped with a jacket connected to a thermostated bath.

The contents of the reactor were placed under stirring and brought to 60° C. When the contents of the reactor had reached 60° C., nitrogen was bubbled through them (in order to remove the oxygen).

One hour after nitrogen bubbling had begun, a first amount of 0.08 g of azobisisobutyronitrile, AIBN, was introduced. The time corresponding to the introduction of this first amount will be called to.

Where, in addition to the n-butyl acrylate, an alkyl methacrylate was employed (in the case of the preparation of the telomers identified as A.4, A.5 and A.6 in Table 1), this methacrylate was introduced dropwise from $t_0$ to $t_0+3$ h.

At $t_0+30$ min, a further 0.08 g of AIBN was introduced into the reactor, and again at $t_0+1$ h, at $t_0+1$ h30, etc. and so on until $t_0+3$ h30, at which time the eighth and last introduction was carried out.

At $t_0+4$ h, the nitrogen bubbling was stopped, the reactor was cooled and the stirring was stopped.

The amount of residual monomer(s) was measured conventionally by gas chromatography. It was customarily less than 2% and most often less than 1% by weight of the monomer(s) introduced.

Table 1 contains the specific elements of the recipes for preparing six telomers identified as A.1 to A.6, prepared in accordance with the general procedure described above.

Determination of the Number Average Degree of Telomerization.

The values $n(M_i)$ associated with each of the monomers $M_i$ employed in the telomerizaton reaction were determined conventionally by proton nuclear magnetic resonance. The number average degree of telomerization, $DP_n$, was obtained by adding up the values $n(M_i)$.

The $DP_n$ values of the telomers prepared in this example are also contained in Table 1.

TABLE 1

Operating conditions and characterization of the telomers

| Identifier | Monomer(s) (amount(s) employed) | Telogen (amount employed) | $DP_n$ |
|---|---|---|---|
| Substances A (telomers having a $DP_n$ of less than or equal to 8.0) | | | |
| A.1 | n-butyl acrylate (50.0 g) | 2-mercaptoethanol (15.2 g) | 2.6 |
| A.2 | n-butyl acrylate (50.0 g) | 2-mercaptoethanol (22.9 g) | 1.5 |
| A.3 | n-butyl acrylate (50.0 g) | 1-butanethiol (17.6 g) | 2.3 |
| A.4 | n-butyl acrylate (30.0 g) + methyl methacrylate (20.0 g) | 2-mercaptoethanol (16.9 g) | 1.8 |
| A.5 | n-butyl acrylate (30.0 g) + n-butyl methacrylate (20.0 g) | 2-mercaptoethanol (14.6 g) | 2.3 |
| A.6 | n-butyl acrylate (30.0 g) + n-butyl methacrylate (20.0 g) | 1-butanethiol (16.9 g) | 2.0 |
| Telomers having a $DP_n$ of greater than 8.0 | | | |
| C.1 | n-butyl acrylate (10.0 g) | isopropanol (47.7 g) | >10 |
| C.2 | n-butyl acrylate (10.0 g) | isopropanol (95.4 g) | 9.0 |

EXAMPLE 2

Comparative Example

Preparation and Determination of the Number Average Degree of Telomerization of Telomers Other than the Substances A The telomers identified as C.1 and C.2 in Table 1 are telomers having a number average degree of telomerization of greater than 8.0. The telomers C.1 and C.2 were prepared as in Example 1 except that the amount of AIBN introduced every half an hour from $t_0$ to $t_0+3$ h30 was 0.016 g (instead of 0.08 g). The procedure used to determine the $DP_n$ of these telomers was the same as that in Example 1.

EXAMPLE 3

Composition and Plates According to the Invention

Dissolution Temperature $T_d$ 48 g of substance A were introduced into a beaker in which there was immersed a precision thermometer. Stirring was commenced and then 2 g of vinyl chloride polymer SOLVIN® 271PC were introduced into this beaker. With continued stirring, the mixture was heated at approximately 3° C./min. When the temperature rose, the mixture gradually became clear and the outlines of the grains of SOLVIN® 271PC polymer progressively disappeared. At a given temperature, they disappeared completely. This temperature was taken as $T_d$.

The results of the measurements of the dissolution temperature $T_d$ are summarized in Table 2.

The lower the dissolution temperature $T_d$, the greater the compatibility between substance A and the vinyl chloride polymer of the composition.

Premixing.

A vessel was charged with 100 g of SOLVIN® 271PC polymer (vinyl chloride polymer obtained by the suspension process), 56 g of substance A, 7 g of epoxidized soya oil, 0.2 g of STAVINOR® CA31 heat stabilizer and 0.4 g of STAVINOR® ZNE heat stabilizer. These ingredients were premixed manually for approximately 1 minute using a glass stirrer.

Kneading.

Following premixing, the contents of the vessel were poured between the two heating rolls, spaced apart by 0.3 mm, of a COLLIN® two-roll kneader, after the rolls had been stabilized at a temperature of 150° C. The material which ran out between the two rolls was collected in a metal tank placed beneath them and poured again between the two rolls. This procedure was continued until the material formed a thin sheet (that is, until the material remained stuck to one of the rolls). At this point, the spacing between the rolls was increased to 1.0 mm and the kneading operation was continued for exactly 5 minutes. During this period, one part of the sheet, alternatively the right-hand part and the left-hand part, was cut off every approximately 20 seconds and the part of the sheet thus detached was replaced between the heating rolls to be rekneaded. After the 5 minutes had elapsed, the spacing between the rolls was increased to 1.5 mm. The sheet was removed from the kneader and immediately placed on a cold, firm surface.

Pressing.

The sheets thus formed were pressed using a LAFARGE® press so as to give plates with a thickness of 4 mm and a surface area of 20×11.5 mm². The pressing conditions were as follows: the pressing temperature was 160° C.; the pressing pressure was 50 bar; the pressing time was 1 minute.

Extraction Test.

A plate manufactured as described above was weighed with precision. The result of this measurement was taken as $m_0$. The plate was immersed in a pillbox containing 10 ml of n-hexane. The pillbox was closed hermetically and then placed in an oven heated at 40° C. After 24 hours, the pillbox was removed from the oven, opened, and the plate wetted with n-hexane was removed. The surface of the wetted plate was gently wiped and the plate was reweighed. The result of this measurement was taken as $m_1$. The plate was replaced in an oven heated at 70° C. Four hours later, the plate was reweighed again. The result of this measurement was taken as $m_2$. The quantity $E_{02}=(m_0-m_2)/m_0$ represents the weight fraction of material extracted from the plate during the extraction test. Furthermore, the quantity $E_{12}=(m_1-m_2)/m_0$ represents the weight fraction of n-hexane absorbed through the plate during the extraction test.

The results of the extraction tests are summarized in Table 2. The substances A present in the compositions were those of Example 1.

EXAMPLE 4

Comparative Example

Example 2 was repeated except that the substance A was replaced weight for weight by the telomer C.1 or C.2 of Example 2, or else by di-2-ethylhexyl phthalate or di-2-ethylhexyl adipate.

The results of the measurements of the dissolution temperature $T_d$ and of the extraction tests are summarized in Table 2.

TABLE 2

Results of the evaluations of the compositions and of plates prepared from these compositions

| Nature of the composition | $T_d$ (° C.) | $E_{02}$ | $E_{12}$ |
|---|---|---|---|
| Compositions according to the invention | | | |
| Composition comprising telomer A.1 | 147 | 0.061 | 0.040 |
| Composition comprising telomer A.2 | 143 | n.d. | n.d. |
| Composition comprising telomer A.3 | 135 | n.d. | n.d. |
| Composition comprising telomer A.4 | 145 | n.d. | n.d. |
| Composition comprising telomer A.5 | 140 | 0.054 | 0.040 |
| Composition comprising telomer A.6 | 140 | n.d. | n.d. |
| Comparative examples | | | |
| Composition comprising telomer C.1 | >190 | n.d. | n.d. |
| Composition comprising telomer C.2 | 165 | n.d. | n.d. |
| Composition comprising di-2-ethylhexyl phthalate (DOP) | 135 | 0.191 | 0.104 |
| Composition comprising di-2-ethylhexyl adipate (DOA) | 150 | n.d | n.d | n.d.—not determined

The compositions comprising telomers A.1 to A.6 have a dissolution temperature lower than that of the compositions comprising telomers C.1 and C.2, which shows that telomers A.1 to A.6 have better compatibility with vinyl chloride polymers than do the telomers C.1 and C.2.

Furthermore, the compositions comprising telomers A.1 to A.6 have a dissolution temperature ranging from 135° C. to 147° C., which is a dissolution temperature range similar to that of the compositions comprising low molecular weight esters (from 135° C. to 150° C.), the said low molecular weight esters being reputed to have very good compatibility with vinyl chloride polymers.

The plates manufactured from the compositions comprising telomers A.1 to A.6 have a markedly higher extraction resistance and absorption resistance than plates manufactured from the compositions comprising di-2-ethylhexyl phthalate or di-2-ethylhexyl adipate.

EXAMPLE 5

Plastisol Compositions According to the Invention

Mixing 66 g of substance A identified as A.1 or A.5 and 2 g of IRGASTAB® BZ505 heat stabilizer were introduced into a DISPERMAT® rapid mixer equipped with a jacket connected to a thermostated bath. The mixture was stirred at 500 rpm for 20 s using a helical stirrer. With continued stirring, 100 g of a vinyl chloride polymer obtained by the emulsion process, SOLVIN® 373MH, were slowly introduced into the mixer. Mixing was continued at 500 rpm until the composition had acquired the homogeneous consistency of a paste ("mastic" phase). A spatula was used to scrape the walls of the mixer and the stirrer, which commonly became covered by a sticky layer of the vinyl chloride polymer (which had escaped the mixture), and this sticky layer was reintroduced into the centre of the plastisol composition ("decrusting" step). The composition was then stirred at 200 rpm for 5 minutes.

Deaeration

The plastisol composition was placed under vacuum in an appropriate container. The plastisol composition swelled. At regular intervals of time, the vacuum was removed in order to prevent the plastisol composition from overrunning its container. At a given time, the plastisol composition dropped back. When this time was reached, the application of a vacuum was continued for 10 minutes. The container holding the deaearated plastisol composition was then closed hermetically with a cover, and this container was then placed in a thermostated bath at 23° C.

Test of Deaeration Behaviour.

10 ml of the non-deaerated plastisol composition were placed into a 100 ml measuring cylinder. The volume occupied by the plastisol composition was taken as $V_0$. The cylinder was placed under vacuum. The plastisol composition swelled to occupy a maximum volume ($V_f$). The plastisol composition then fell back. the maximum expansion rate of the plastisol composition ($\Delta V_{max}$) was calculated by the following relationship:

$$\Delta V_{max}=100\cdot(V_f-V_0)/V_0 \text{ (in \%)}.$$

The higher the value $\Delta V_{max}$, the more difficult it is to deaerate the plastisol composition.

Viscosity Measurements.

The viscosity of the deaerated plastisol composition was measured at various shear rates (D) after it had been held at rest for 1 h in a thermostated bath at 23° C. The measurements were conducted conventionally using a ROTO-VISCO® RV20 rotational viscometer. The parameters $\eta_{1.4}$, $\eta_{12}$ and $\eta_{36}$ designate, respectively, the viscosity measurements at D=1.4, 12 and 36 s$^{-1}$.

The results of the evaluations of the plastisol compositions are summarized in Table 3.

EXAMPLE 6

Comparative Example

The procedure of Example 5 was repeated except that the substance A was replaced weight for weight by di-2-ethylhexyl phthalate.

The results of the evaluations of this plastisol composition are likewise summarized in Table 3.

TABLE 3

Results of the evaluations of the plastisol compositions

| Nature of the plastisol compositions | $\Delta V_{max}$ (%) | $\eta_{1.4}$ (Pa·s) | $\eta_{12}$ (Pa·s) | $\eta_{36}$ (Pa·s) |
|---|---|---|---|---|
| Plastisol compositions according to the invention | | | | |
| Composition comprising telomer A.1 | 650 | 7 | 5 | 4 |
| Composition comprising telomer A.5 | 580 | 7 | 6 | 5 |
| Comparative example | | | | |
| Plastisol composition comprising di-2-ethylhexyl phthalate | 950 | 7 | 6 | 5 |

The plastisol compositions comprising telomers A.1 and A.5 deaerate much more easily than the plastisol composition comprising di-2-ethylhexyl phthalate. Moreover, the plastisol compositions comprising telomers A.1 and A.5 are at least as fluid as the plastisol composition comprising di-2-ethylhexyl phthalate.

The invention claimed is:

1. A composition comprising one or more polymers and one or more substances selected from substances A and, optionally, from substances B, wherein the weight of substance(s) A plus substance(s) B together relative to the weight of the composition is greater than 20%, and the weight of substance(s) A relative to the weight of substance(s) A plus substance(s) B together is greater than 20%, the substances A are telomers having a number average degree of telomerization of less than or equal to 8.0 and are obtained by a (co)telomerization reaction of one or more telogens and one or more monomers corresponding to the formula I:

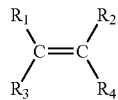

(I)

in which $R_1$, $R_2$, $R_3$ and $R_4$, which are identical or different, represent groups

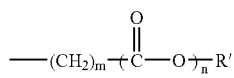

the indices m independently of one another are integers from 0 to 20,
the indices n independently of one another are 0 or 1,
the sum of the indices n is from 1 to 3, and
when n=0, the radicals R' independently of one another are a hydrogen atom, a halogen atom or a phenyl group,
when n=1, the radicals R' independently of one another are hydrogen, atoms or alkali metal atoms, ammonium groups, halogen atoms, or hydrocarbon groups, and the hydrocarbon groups are optionally substituted by one or more halogen atoms or —OH, —COOH, —NH$_2$, —CONH$_2$ or —N=C=O groups,
the substances B comprise one or more compounds selected from the group consisting of diesters of phthalic, terephthalic and isophthalic acids, triesters of trimellitic acid, diesters of saturated aliphatic α,ω-dicarboxylic acids, acetylated or non-acetylated triesters of citric acid, triesters of phosphoric acid, and alkylene glycol dibenzoates and alkylsulphonic esters of phenol.

2. The composition according to claim 1, wherein at least 80% by weight of the polymers are halogenated vinyl polymers.

3. The composition according to claim 2, wherein the halogenated vinyl polymers are vinyl chloride polymers comprising at least 80% by weight of —(—CH$_2$—CHCl—)— units.

4. The composition according to claim 1, wherein the substances A have a number average degree of telomerization of less than or equal to 5.0.

5. The composition according to claim 4, wherein the substances A have a number average degree of telomerization of greater than or equal to 1.2.

6. The composition according to claim 1, wherein the weight of substance(s) A relative to the weight of the composition is greater than 20%.

7. The composition according to claim 1, wherein the monomers corresponding to formula I meet at least one of the following conditions:
the sum of the indices m is from 0 to 2,
the sum of the indices n is 1,
when n=0, R' represents a hydrogen atom,
when n=1, the radicals R' independently of one another are a linear or branched alkyl or alkenyl chain containing 1 to 20 carbon atoms which is optionally substituted by one or more halogen atoms or —OH, —COOH, —NH$_2$, —CONH$_2$ or —N=C=O groups.

8. The composition according to claim 7, wherein the monomers corresponding to the formula I are selected from the group consisting of C$_1$–C$_{20}$ alkyl acrylates and C$_1$–C$_{20}$ alkyl methacrylates.

9. The composition according to claim 1, wherein the substances B are selected from the group consisting of diesters of saturated aliphatic α,ω-dicarboxylic acids, acetylated or non-acetylated triesters of citric acid, triesters of phosphoric acid, and from alkylene glycol dibenzoates and alkylsulphonic esters of phenol.

10. The composition according to claim 1, wherein the weight of substance(s) B relative to the weight of the composition is less than 20%.

11. An article or a part of an article of manufacture comprising a composition,
wherein the composition comprises one or more polymers and one or more substances selected from substance(s) A and, optionally from substance(s) B, and the weight of substance(s) A plus substance(s) B, together, relative to the weight of the composition, are greater than 20%; and the weight of substance(s) A relative to the weight of substance(s) A plus substance(s) B together are greater than 20%,
the substance(s) A are telomers having a number average degree of telomerization of less than or equal to 8.0 and are obtained by a (co)telomerization reaction of one or more telogens and one or more monomers corresponding to formula 1:

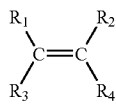

in which $R_1$, $R_2$, $R_3$ and $R_4$, which are identical or different, and represent groups

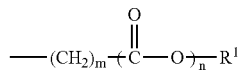

the indices m independently of one another are integers from 0 to 20,
the indices n independently of one another are 0 or 1,
the sum of the indices n is from 1 to 3,
when n=0, the radicals R' independently of one another are a hydrogen atom, a halogen atom or a phenyl group,
when n=1, the radicals R' independently of one another are selected from the group consisting of a hydrogen atom an alkali metal atom, an ammonium group, a halogen atom, and a hydrocarbon group, the latter being optionally substituted by one or more halogen atoms or —OH, —COOH, —NH$_2$, —CONH$_2$ or —N═C═O groups,
the substance(s) B are selected from the group consisting of diesters of phthalic, terephthalic and isophthalic acids, triesters of trimellitic acid, diesters of saturated aliphatic α,ω-dicarboxylic acids, acetylated or non-acetylated triesters of citric acid, triesters of phosphoric acid, and alkylene glycol dibenzoates and alkylsulphonic esters of phenol.

12. The article or part of an article according to claim 11, wherein at least 80% by weight of the polymer is one or more halogenated vinyl polymers.

13. The article or part of an article according to claim 12, wherein the halogenated vinyl polymer is at least one vinyl chloride polymer having at least 80% by weight of —(—CH$_2$—CHCl—)— units.

14. The article or part of an article according to claim 11, wherein the substance(s) A have a number average degree of telomerization of less than or equal to 5.0.

15. The article or part of an article according to claim 14, wherein the substance(s) A have a number average degree of telomerization of greater than or equal to 1.2.

16. The article or part of an article according to claim 11, wherein the weight of substance(s) A relative to the weight of the composition is greater than 20%.

17. The article or part of an article according to claim 11, wherein the monomers corresponding to formula I meet at least one of the following conditions:
the sum of the indices m is from 0 to 2,
the sum of the indices n is 1,
when n=0, R' represents a hydrogen atom,
when n=1, the radicals R' independently of one another are a linear or branched alkyl or alkenyl chain containing 1 to 20 carbon atoms which is optionally substituted by one or more halogen atoms or —OH, —COOH, —NH$_2$, —CONH$_2$ or —N═C═O groups.

18. The article or part of an article according to claim 17, wherein the monomers corresponding to formula I are selected from the group consisting of $C_1$–$C_{20}$ alkyl acrylates and $C_1$–$C_{20}$ alkyl methacrylates.

19. The article or part of an article according to claim 11, wherein the substance(s) B are selected from the group consisting of diesters of saturated aliphatic α,ω-dicarboxylic acids, acetylated or non-acetylated triesters of citric acid, triesters of phosphoric acid, and from alkylene glycol dibenzoates and alkylsulphonic esters of phenol.

20. The article or part of an article according to claim 11, wherein the weight of substance(s) B relative to the weight of the composition is less than 20%.

* * * * *